E. G. STAUDE.
VARIABLE SPEED GEARING.
APPLICATION FILED SEPT. 10, 1912.

1,193,728.

Patented Aug. 8, 1916.
3 SHEETS—SHEET 3.

WITNESSES
J. A. Karnes.
G. E. Sorensen

INVENTOR
EDWIN G. STAUDE.
BY Paul & Paul
HIS ATTORNEYS

UNITED STATES PATENT OFFICE.

EDWIN GUSTAVE STAUDE, OF MINNEAPOLIS, MINNESOTA, ASSIGNOR TO E. G. STAUDE MANUFACTURING CO., OF MINNEAPOLIS, MINNESOTA, A CORPORATION.

VARIABLE-SPEED GEARING.

1,193,728.   Specification of Letters Patent.   Patented Aug. 8, 1916.

Application filed September 10, 1912. Serial No. 719,575.

*To all whom it may concern:*

Be it known that I, EDWIN G. STAUDE, of Minneapolis, Hennepin county, Minnesota, have invented certain new and useful Improvements in Variable-Speed Gearing, of which the following is a specification.

The primary object of my invention is to provide a positive variable speed gearing, the driving member of which shall be connected with the driven member at all times during the operation of changing the speed.

A further object of my invention is to provide a gearing which shall have a direct drive on high speed.

A further object is to provide a simple and efficient reverse mechanism.

A further object is to provide a construction which shall be simple and compact as well as highly efficient in the economical transmission of power.

A further object, and one of special importance, is to provide a gearing wherein the load is balanced in such a manner as to equalize the pressure against the shifting lever, thus providing a balanced shifting mechanism.

The invention consists generally in various constructions and combinations, all as hereinafter described and particularly pointed out in the claims.

Figure 1:
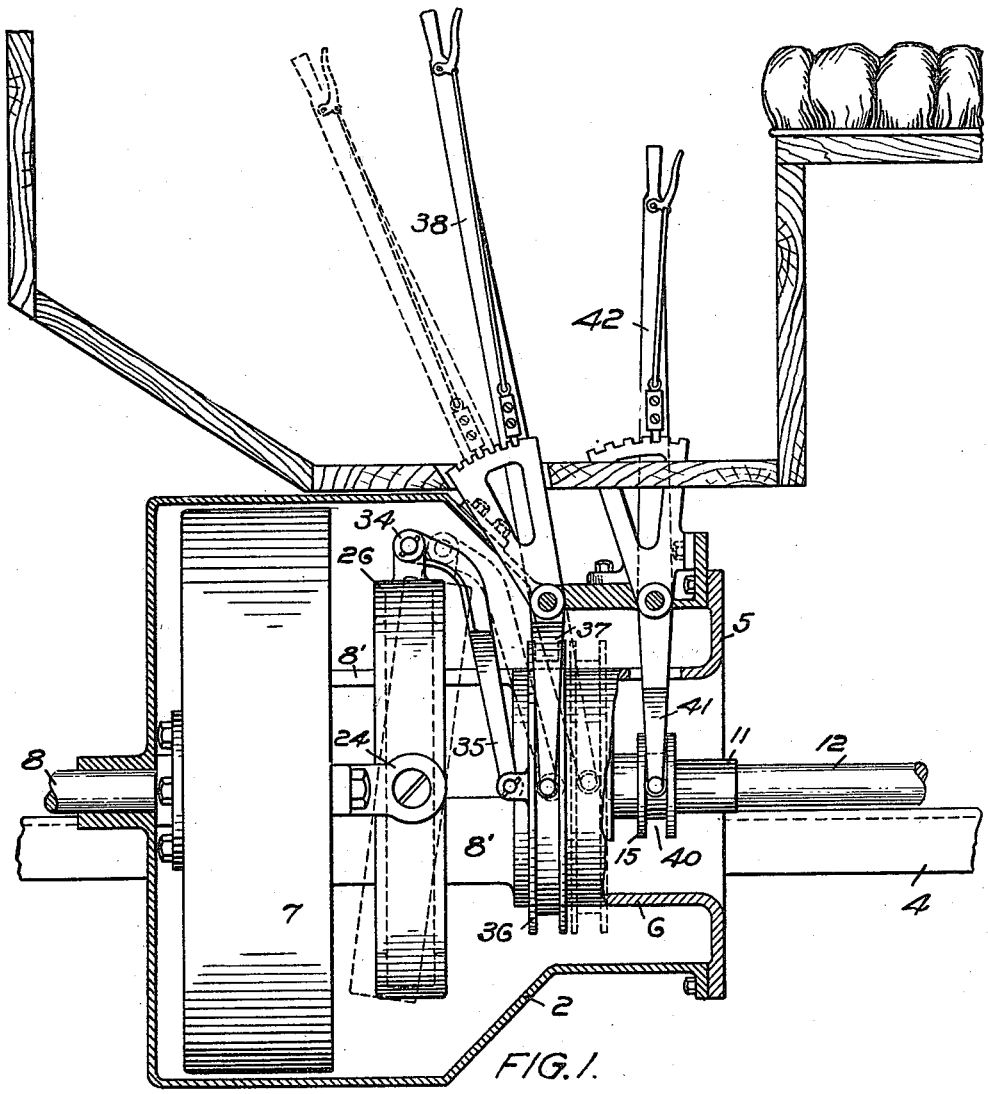
Figure 2:
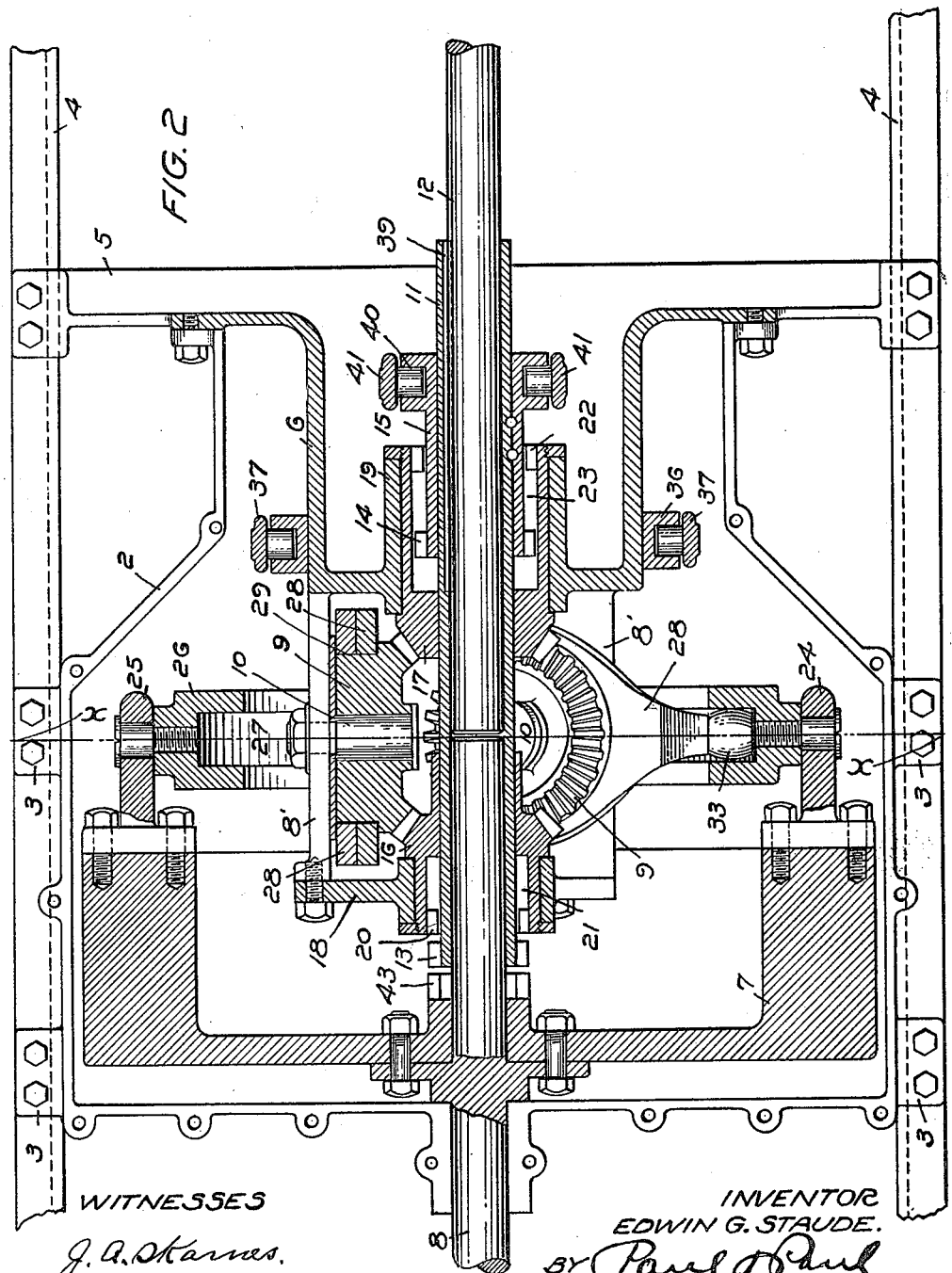
Figure 3:
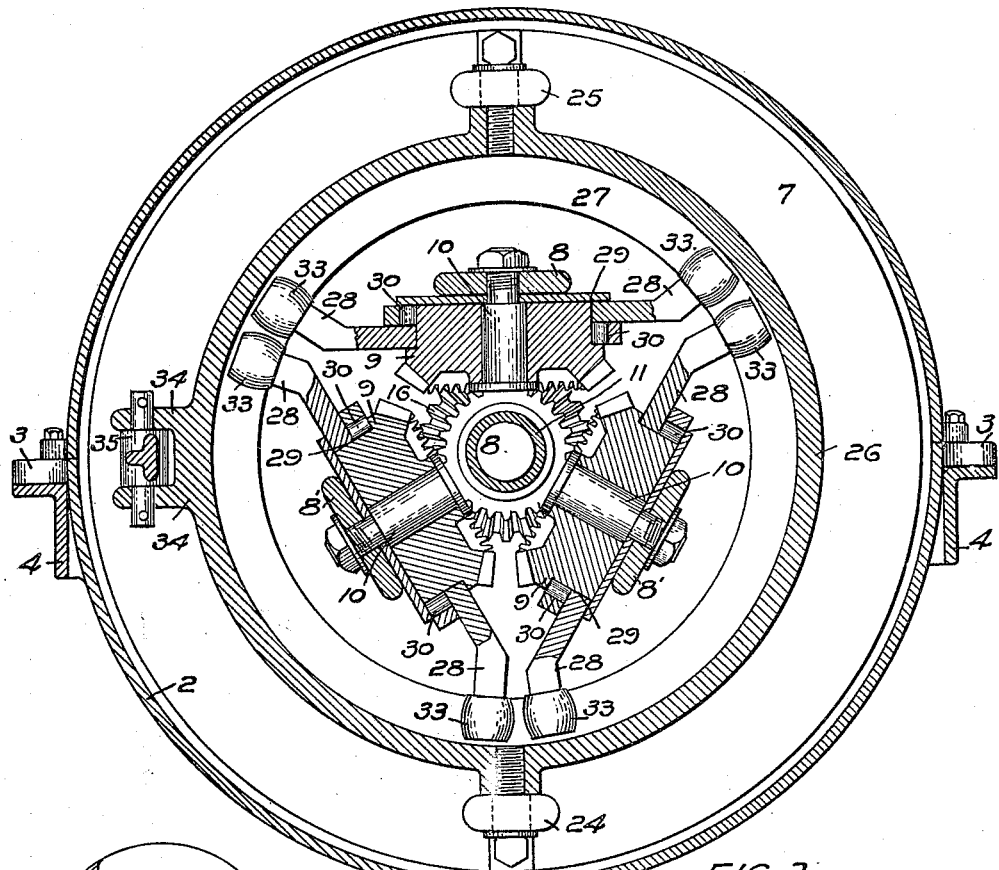
Figure 4:
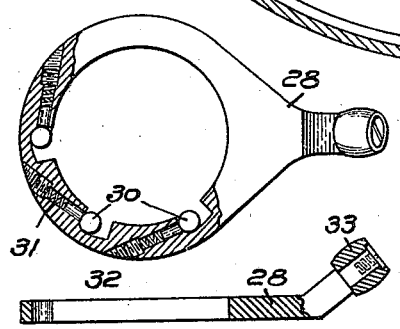
Figure 5:

In the accompanying drawings forming part of this specification, Figure 1 shows a vertical section of a gearing embodying my invention, Fig. 2 is a horizontal section thereof, Fig. 3 is a cross section on the line x—x of Fix. 2, Figs. 4 and 5 are details of the gripping and releasing mechanism.

As shown in the drawings, 2 represents a frame or housing inclosing my variable sped gearing. This housing has lugs 3 adapted to secure it to a suitable automobile frame 4. A casting 5 is also secured to the frame 4 in a similar manner and bolted to the part 2. This casting 5 has a hub 6 extending toward the front of the machine, concentric with a fly wheel 7, which is secured to the engine crank shaft 8. The forward part of the hub 6 is provided with three bars 8′ and each of these bars has a bevel gear 9 supported by a stud 10. A sleeve 11 is splined on the driven shaft 12 and telescopes with the engine shaft 8. This sleeve has lugs 13 formed on one end thereof and lugs 14 are provided on a sleeve 15 which is preferably formed separately and incloses the sleeve 11. These sleeves are secured to each other in assembling the gearing.

Loosely mounted on the sleeve 11 are gears 16 and 17. These gears have bearings in spiders 18 and 19 carried by the bars 8′ and the hub 6. The gears 16 and 17 mesh with the gears 9. The gear 16 is provided with inwardly projecting lugs 20 adapted to engage the lugs 13, and an annular recess 21 is provided in the gear 16 to form a space for neutral position before reversing. The gear 17 is provided with lugs 22 and an annular recess 23 for a similar purpose. The lugs 14 are adapted to mesh with the lugs 22 and when in this position the driven shaft 12 will revolve in the opposite direction from the engine shaft, as will be later described.

Mounted on the fly wheel 7 are brackets 24 and 25 and pivoted on these brackets is a ring 26 having an internal annular groove 27. Operating in this groove are a series of oscillating arms 28. These arms are mounted on a hub 29 of the gear 9 and by means of small rollers 30 held forward by springs 31 and operating over inclined surfaces 32 are adapted to grip the hub of the gear 9 when the arms 28 are moved in one direction and release it when the arms 28 are moved in the other direction.

Suitable rollers 33, mounted at the outer ends of the arms 28, operate in the groove 27. The ring 26 is provided with lugs 34 connected by a forked member 35 to a collar 36 which is slidably mounted on the hub 6 and is adapted to receive the lower forked portion 37 of an operating lever 38.

From the construction so far described, it is obvious that when the ring 26 is in a plane at right angles to the driving and driven shafts, as shown in Fig. 1, there will be no movement imparted to the arms 28 and consequently no movement of the gears or the driven shaft 11, even though the engine shaft is revolving continuously. As soon as the lever 38 is moved forward to the dotted line position of Fig. 1, it will tilt the ring 26 and cause the arms 28 to oscillate, and through the action of the rollers 30 and the springs 31 will cause the bevel gears 9 to move in one direction similar to the action caused by the operation of a pawl on a ratchet wheel. The degree of the tilting movement of the member 26 determines the speed of the driven member 12. The ring being tilted and power being applied to the bevel gears 9, which in turn mesh with the gears 16 and 17, the gears 16 and 17 will revolve in opposite directions. If the sleeve 11 is moved to bring the lugs 13 into mesh with the lugs 20 on the gear 16, it follows that the sleeve 11 must revolve with the gear 16 in a forwardly direction, and if the sleeve 11 is moved in the other direction to bring the lugs 14 into mesh with the lugs 22, the sleeve 11 must revolve in the opposite direction or in the direction that the gear 17 revolves.

I prefer to spline the sleeve 11 on the driven shaft 12, by means of a key 39. To operate this sleeve 11 I prefer to provide an annular groove 40 in the member 15, which is formed on the sleeve 11, and said groove 40 is adapted to receive a fork 41 of the lever 42 so that by moving the lever 42 back and forth I may shift the sleeve 11 on the driven shaft. After the momentum of the machine has been attained, if I so desire, I move the sleeve 11 forward so that the lugs 13 will come out of mesh with the lugs 20 and after passing into neutral, I move them forward into mesh with lugs 43 secured to the driving shaft and preferably a part of the same and, when in this position, the mechanism will be in direct drive.

In the operation of the device, referring to Fig. 2 of the drawings, the fly wheel 7 and the ring 26 will revolve continuously with the driving shaft 8, and as long as the ring 26 is in the position shown in Fig. 2, in a plane at right angles to the driving and driven shafts, the gearing will remain stationary and the driven shaft 12 will not be operated, even though the sleeve 11 be moved to bring the lugs 13 into mesh with the lugs 20. If it is desired to start the shaft 12, the operator will move the lever 42 and slide the lugs 13 into mesh with the lugs 20. Then by the operation of the lever 38, the ring 26 may be tilted on its axis so that the annular groove 47 will, in effect, form a cam track for the outer ends of the arms 28. The revolution of the ring 26, when tilted, will impart an oscillating movement to the arms 28 and through the ratchet connections of these arms with the gears 9, the said gears will be revolved, and through the gear 16 the lugs 20, the lugs 13, the sleeve 11 and the shaft 12 will be revolved also, for the forward drive.

To reverse the direction of movement of the shaft 12, the ring 26 will first be restored to the position shown in Fig. 2 and the lever 42 operated to move the lugs 14 into mesh with the lugs 22, and the lugs 13 during this movement will enter the recess 21 and be in a neutral or inoperative position. When the lugs 14 are in mesh with the lugs 22, the lever 38 will again be operated to tilt the ring 26 and the revolution of the gears 19 will drive the gear 17 to reverse the direction of operation of the shaft 12. Whenever desired, the ring 26 may be set in its neutral or inoperative position and the sleeve 11 operated to move the lugs 13 into mesh with the lugs 43, whereupon the drive will be direct from the shaft 8 through the sleeve 11 to the shaft 12.

I claim as my invention:—

1. A variable speed gearing comprising a driving and a driven member, gears mounted concentrically with respect to said driving and driven members and adapted to revolve in opposite directions, means for operatively connecting said driven member with either of said gears, and a ratchet driving connection between said gears and said driving member.

2. A variable speed gearing comprising a driving and a driven member, gears mounted concentrically with respect to said members and revolving in opposite directions, means for operatively connecting said driven member with either one of said gears, a driving connection between said driving member and said gears, and means for connecting said driving member directly to said driven member.

3. A variable speed gearing comprising a driving and a driven member, a gear having a driving connection with said driven member, a second gear meshing with said first named gear, oscillating means having a ratchet connection with said second gear, and means connecting said oscillating means with said driving member.

4. A variable speed gearing comprising a driving and a driven member, a gear operatively connected with said driven member, a second gear meshing with said first named gear, oscillating means having a clutch connection with said second gear, means connecting said oscillating means with said driving member and for varying the stroke of said oscillating means.

5. A variable speed gearing comprising a driving member and a driven member, a gear having a driving connection with said driven member, a second gear meshing with said first named gear, a clutch device provided in connection with said second named gear, and tilting means operatively connecting said clutch device with said driving member to revolve said second gear and through said first named gear to operate said driven shaft.

6. A variable speed gearing comprising a driving member, and a driven member, a gear operatively connected with said driven member, a second gear meshing with said first named gear, an oscillating arm having a clutch connection with said second gear, and a tilting member operatively connected with said driving member and engaging said arm to oscillate the same, the degree of movement of said tilting member on its axis regulating the stroke of said arm and the speed of said gears and driven member.

7. A variable speed gearing comprising a driving member and a driven member, a ring operatively connected with said driving member, and concentric therewith and with said driven member, said ring being adapted to tilt on its pivots into a plane at an angle to the axes of said members, and ratchet driving connections between said ring and said driven member.

8. A variable speed gearing comprising a driving member and a driven member, a ring pivotally connected with said driving member, means for tilting said ring on its pivots, said ring having an internal annular groove therein, gears having driving connections with said driven member, arms having clutch connections with said gears and fitting within said groove, the tilting of said ring causing the oscillation of said arms to operate said gears and driven member, the degree of movement of said ring operating to vary the speed of said driven member.

9. A variable speed gearing comprising a driving and a driven member, driving mechanisms having their axes at right angles substantially to the axis of said driving member, a tilting member encircling and operatively connected with said driving mechanisms, the rotation of said tilting member operating said driving mechanisms successively when said member is tilted, and means for tilting said member.

10. A variable speed gearing comprising a driving member and a driven member, a ring concentric with said driving member and pivotally connected therewith, means for tilting said ring on its pivots, a gear having a driving connection with said driven member, a series of gears encircling said first named gear and meshing therewith, clutch devices mounted on said series of gears and having means engaging said ring, said clutch devices being inoperative when said ring is in a plane at right angles to the axis of said driving member, but becoming operative to revolve said gears when said ring is tilted on its pivots, the degree of the tilting movement of said ring regulating the stroke of said clutch devices and the speed of said driven member.

11. A variable speed gearing comprising a driving and a driven member, concentrically arranged gears concentric with said members and having driving connections with said driven member for forward or reverse movement, a series of gears interposed between said first named gears and meshing therewith, clutches for said series of gears, a ring concentric with said members and pivotally connected with said driving member and revolving continuously therewith and having means for operating said clutches, said clutches and gears being inoperative when said ring is in a plane at right angles to said members, but being actuated to revolve said driven member when said ring is tilted on its pivots, and means for tilting said ring.

12. A variable speed gearing comprising a driving and a driven member, gears having their axes at right angles substantially to the axis of said driving member, a tilting ring encircling and operatively connected with said gears, the rotation of said tilting ring operating said gears successively when said ring is tilted, and means for tilting said ring.

13. A variable speed gearing comprising a driving and a driven member, an arm having a driving connection with said driven member, a tilting member operatively connected with said driving member and engaging said arm to oscillate the same, the degree of movement of said tilting member on its axis regulating the stroke of said arm and the speed of said driven member.

In witness whereof I have hereunto set my hand this 6th day of September, 1912.

EDWIN GUSTAVE STAUDE.

Witnesses:
GENEVIEVE E. SORENSEN,
EDWARD A. PAUL.

Copies of this patent may be obtained for five cents each, by addressing the "Commissioner of Patents, Washington, D. C."